G. N. KINNELL.
OVERSHOE.
APPLICATION FILED JAN. 3, 1910.
1,038,391.
Patented Sept. 10, 1912.
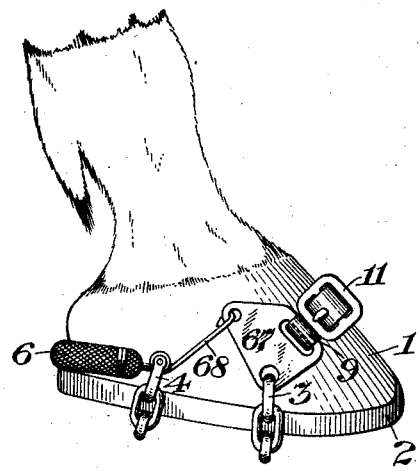
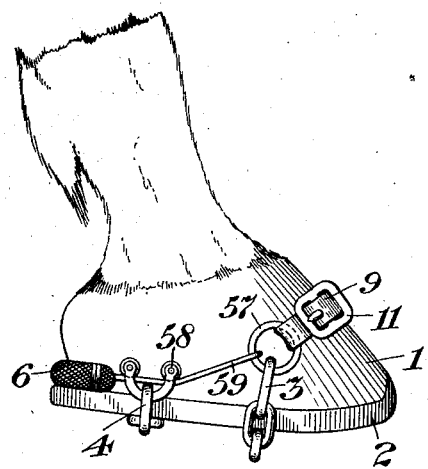
WITNESSES:
INVENTOR
George W. Kinnell
BY
George C. Ream ATTORNEY

UNITED STATES PATENT OFFICE.

GEORGE N. KINNELL, OF PITTSFIELD, MASSACHUSETTS.

OVERSHOE.

1,038,391.  Specification of Letters Patent.  Patented Sept. 10, 1912.

Original application filed March 6, 1909, Serial No. 481,830. Divided and this application filed January 3, 1910. Serial No. 536,057.

*To all whom it may concern:*

Be it known that I, GEORGE N. KINNELL, a citizen of the United States, and a resident of Pittsfield, in the county of Berkshire and State of Massachusetts, have invented certain new and useful Improvements in Overshoes, of which the following is a specification.

My present invention concerns detachable overshoes for various purposes, particularly applicable for use on horses and other hoofed animals for various purposes and particularly to prevent slipping.

My present application is a division of my application Serial No. 481,830 filed March 6, 1909.

In my prior application Serial No. 460,336, I have shown an overshoe consisting of interconnected diagonal strands or articulations adapted to serve as calks and suspended by a spreader and equalizing lever on each side of the foot, subject to upward and forward tension through a toe strap and to rearward tension through a heel member seated in the notches under the heels of the hoof and above the rearwardly projecting ends of the metallic shoe. The heel member may be of fine quality steel wire or chain, but I prefer heavy baling wire which does not stretch and is not very resilient, yet is flexible enough so that in use it fits itself to the surface upon which it bears and becomes bent or set so that there is practically no tendency for it to spring out of position. Various other novel features and functions of said overshoe are explained in said application. In other applications, I have described auxiliary means for supporting the heel member independently of engagement with the heels of the hoof.

For present purposes, I have chosen to show the heel member as consisting of cushioned wire engaging the notches between the ordinary shoe and the heels of the hoof, after the manner set forth in said application Serial No. 460,336; also, the tread members are shown as consisting of strands or articulations in the form of short lengths of chain. These may be disposed across the cavity under the hoof in any desired way, though for most purposes I prefer the diagonal arrangement with an interconnecting central link, such as shown in the aforesaid application.

In all of the figures, the securing means on the overshoe includes a tension member extending diagonally over the toe of the hoof and adapted to oppose downward and rearward displacement, after the manner explained in said application.

The various features constituting my present invention will be evident from the following detailed description in connection with the accompanying drawings, in which—

Figures 1 and 2 are side elevations each showing a horse's hoof with an overshoe embodying various features of my invention.

In all of the figures, the hoof 1 is provided with the metal shoe 2 of the ordinary type projecting slightly beyond the heels of the hoof. In all of the figures, the tread strands are connected to the securing means by end links 3, 4, and in each case the securing means comprises a band encircling the walls of the hoof, comprising a heel member 6 and a toe member or strap 9, adapted to be tightened in place by buckle 11.

In Fig. 1, two tread members are used; no spreader to maintain separation of the forward and rear tread members is necessary since the spreader function is accomplished by causing the rear tread connection 4 to have a sliding engagement with the heel member 6, as at 58, and proportioning the lengths of the members so that the rear tread connection is held down nearly horizontal, while the connecting portion 59, in advance of the sliding engagement at 58, inclines upwardly at a greater angle. In this case, there is practically no lever effect, the upward tension through link 57 being divided between the forward and rear tread links 3, 4, in proportion to the effectiveness of the several angles of stress of the system 6, 4, 59, 9 and the system represented by 59, 3, 9, in giving upward resultants from 9 on their respective tread connections 4 and 3.

Fig. 2 is similar to Fig. 1, insomuch as the heel member is held down by a sliding connection of the rear link 4 but the upward angle of the extension 68 of the heel member is greatly increased by the use of the equalizing lever 67, which divides the tension of the toe strap between the forward tread link 3 and the said extension 68. In said Fig. 2, there is no separate spreader, the spreader function being effected by the difference in direction of pull of 6 and 68 upon sliding member 4, which operates to maintain 4 in the rearward position, while the positive pull of the toe strap maintains the forward link 3 in the forward position.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a device of the class described, flexible tread connections, and securing means comprising a diagonally arranged toe member, a rearwardly extending heel member, and an equalizing lever secured to the forward tread connection at one end and at the other end, to a member having sliding engagement with the rear tread connection, and to the toe strap by means adapted to cause the tension of the latter to take effect on said equalizing lever as if applied at a point intermediate its ends.

2. An overshoe comprising articulated tread strands adapted to serve as calks beneath the tread of the hoof, in combination with securing means therefor comprising a toe member connected to the forward strands and adapted to afford upward and forward tension, and a member having sliding engagement with the rear strands and passing around the heel of the hoof in the direction adapted to afford rearward tension in a direction more nearly horizontal than the direction of tension of said toe member.

3. An overshoe comprising articulated tread strands adapted to serve as calks beneath the tread of the hoof, in combination with securing means therefor comprising a toe member connected to the forward strands and adapted to afford upward and forward tension, and a member having sliding engagement with the rear strands and passing around the heel of the hoof in a direction adapted to afford rearward tension in a direction more nearly horizontal than the direction of tension of said toe member, the desired directions of tension of the several members being predetermined by the lengths of the respective members.

4. In a device of the class described, flexible tread connections and securing means comprising a diagonally arranged toe member, a rearwardly extending heel member and a straight equalizing lever secured to the forward tread connection at one end and at the other end to a member having sliding engagement with the rear tread connection and connected to the toe strap so that the tension of the latter is applied to said equalizing lever at a point intermediate its ends.

5. In a device of the class described, flexible tread connections and securing means comprising a diagonally arranged toe member, a rearwardly extending heel member, an intermediate member secured to the forward tread connection, and a member extending between said intermediate member and said heel member having a sliding engagement with the rear tread connection.

6. An overshoe comprising a flexible tread and securing means disposed about the wall of the hoof and having a connection with a tread part slidable automatically during use.

Signed at New York in the county of New York and State of New York this twenty third day of December A. D. 1909.

GEORGE N. KINNELL.

Witnesses:
GEORGE C. DEAN,
IRVING M. OBRIEGHT.

---

Copies of this patent may be obtained for five cents each, by addressing the "Commissioner of Patents, Washington, D. C."